United States Patent [19]
Butters et al.

[11] Patent Number: 6,136,203
[45] Date of Patent: Oct. 24, 2000

[54] SYSTEM AND METHOD FOR PHOTOCATALYTIC TREATMENT OF CONTAMINATED MEDIA

[75] Inventors: Brian E. Butters; Anthony Leonard Powell, both of London, Canada

[73] Assignee: Purifics Enviromental Technologies, Inc., London, Canada

[21] Appl. No.: 09/146,987

[22] Filed: Sep. 3, 1998

Related U.S. Application Data

[60] Provisional application No. 60/058,411, Sep. 10, 1997.

[51] Int. Cl.[7] ..................................................... C02F 1/48
[52] U.S. Cl. ...................... 210/743; 210/748; 210/759; 210/763; 210/765; 422/186.3; 204/157.3
[58] Field of Search ..................................... 210/747, 748, 210/759, 763, 765, 743; 422/186.3; 204/157.15, 157.3

[56] References Cited

U.S. PATENT DOCUMENTS

| 3,951,797 | 4/1976 | Seely | 210/748 |
|---|---|---|---|
| 4,123,355 | 10/1978 | Poradek | 210/50 |
| 4,793,931 | 12/1988 | Stevens | 210/748 |
| 4,861,484 | 8/1989 | Lichtin et al. | 210/638 |
| 5,032,241 | 7/1991 | Robertson et al. | 210/748 |
| 5,045,288 | 9/1991 | Raupp et al. | 422/186.3 |
| 5,118,422 | 6/1992 | Cooper et al. | 210/636 |
| 5,130,031 | 7/1992 | Johnston | 210/748 |
| 5,152,976 | 10/1992 | Fong et al. | 423/652 |
| 5,174,877 | 12/1992 | Cooper et al. | 204/193 |
| 5,190,670 | 3/1993 | Stearns | 210/767 |
| 5,224,051 | 6/1993 | Johnson | 364/474.11 |
| 5,256,308 | 10/1993 | Dulany | 210/748 |
| 5,462,674 | 10/1995 | Butters et al. | 210/748 |
| 5,478,481 | 12/1995 | Kazama et al. | 210/748 |
| 5,480,524 | 1/1996 | Oeste | 210/748 |
| 5,554,300 | 9/1996 | Butters et al. | 210/748 |
| 5,580,461 | 12/1996 | Cairns et al. | 210/673 |
| 5,589,078 | 12/1996 | Butters et al. | 210/748 |
| 5,593,569 | 1/1997 | Sherman | 208/108 |
| 5,593,737 | 1/1997 | Meinzer et al. | 427/512 |
| 5,817,240 | 10/1998 | Miller | 210/759 |

(List continued on next page.)

OTHER PUBLICATIONS

"Presentation of our New Photocatalytic Technology" Press Release, www.aianet.ne.jp/daini–kk, May 12, 1998.

J.R. Kittrell "Air–I Process Unit Demonstrated at Dover Air Force Base" www.nttc.edu/env/site95/emrg/ongoing/kseinc.html, Jul. 9, 1998 p. 1–2.

Charles R. Painter and Stephen N. Stiles "Radiant Decomposition of Airborne VOCs" www.fsec.ufc.edu///at/detox.htm, Feb. 18, 1998, p. 1–2.

J.R.Kittrell, D.J. Hennessey, Vicenta, Gallardo, John Smalddone, and Michael Nalipiaski "Full Scale Phtocatalytic Destruction of SVE Emissions", technical abstract from the World Environmental Congress Oct. 26, 1996.

T.E. Chapman and K.B. Wong "Lessons Learned with Photolytic and Photocatalytic Vapor Phase Technologies at McClellan Air Force Base" technical abstract from The Third International Conference on Advanced Oxidation Technologies for Water and Air Remediation—Final Program, Oct. 26, 1996.

T.E. Chapman and K.B. Wong "Cost and Performance of Innovative and Conventional Vapor Phase Treatment Technologies at McClellan Air Force Base" p. 160.

T.E. Chapman and K.B. Wong "A Comparison of Innovative Vapor Phase Treatment Technologies at McClellan Air Force Base" p. 161.

"The Third International Conference on Advanced Oxidation Technologies for Water and Air Remediation"—Final Program, Oct. 26–29, 1996, p. 1–12.

(List continued on next page.)

Primary Examiner—Chester T. Barry
Attorney, Agent, or Firm—Baker & McKenzie

[57] ABSTRACT

A system for treating contaminated media is provided. In the process, contaminants are removed from the media using a photocatalytic process operating in an aqueous phase.

20 Claims, 6 Drawing Sheets

U.S. PATENT DOCUMENTS 5,849,201 12/1998 Bradley .................................... 210/752
5,933,702 8/1999 Goswami .............................. 422/186.3

OTHER PUBLICATIONS

"The Third International Conference on Advanced Oxidation Technologies for Water and Air Remediation"—Abstracts, Oct. 26–29, 1996, p. iii–xviii.

"The Second International Conference on TiO2 Photocatalytic Purification and Treatment of Water and Air"—Final Program, Oct. 26–29, 1996 p. 1–8.

"1998 Pan–American Workshop on Commercialization of Advanced Oxidation Technologies"—Final Program, Jun. 27–30, 1998, p. 1–5.

"World Environmental Congress"—Final Program, Oct. 26–29, 1996. P. 1–11.

SYSTEM AND METHOD FOR PHOTOCATALYTIC TREATMENT OF CONTAMINATED MEDIA

CLAIM OF PRIORITY

The present application claims priority to U.S. provisional application serial No. 60/058,411, entitled "Photocatalytic Air Treatment," with named applicants Brian E. Butters and Anthony L. Powell, filed Sep. 10, 1997.

RELATED PATENT APPLICATIONS

The present application is related to U.S. Pat. No. 5,462,674, "Method and System for Photocatalytic Decontamination," Brian E. Butters and Anthony L. Powell inventors, issued Oct. 31, 1995; U.S. Pat. No. 5,589,078, "Advanced Filtration Technique for Fluid Purification," Brian E. Butters and Anthony L. Powell, inventors, issued Dec. 31, 1996; and U.S. Pat. No. 5,554,300, "Purification System," Brian E. Butters and Anthony L. Powell, inventors, issued Sep. 10, 1996.

FIELD OF THE INVENTION

The present invention relates to contaminant treatment systems, and more particularly to a system and method for photocatalytic treatment of contaminated media.

BACKGROUND

Treatment systems and techniques for removing contaminants from contaminated gas have been developed in the past. Some of these treatment systems and techniques include treatments using a photocatalytic process. Common photocatalytic treatment methods typically make use of a technique by which a photocatalyst is bonded or fixed to a substrate or a fluidized bed reactor. Photocatalytic reactions are then caused by irradiating electromagnetic radiation such as ultraviolet light on the fixed photocatalyst so as to activate it. Resulting photocatalytic reactions bring about destruction of contaminants, such as volatile organic contaminants or other biologically harmful compounds that are in close proximity to the activated photocatalyst.

Several significant problems may be encountered when using known photocatalytic air treatment systems and techniques. One problem is the need to maximize "mass transfer," which is the number of collisions between contaminants and an activated photocatalyst. Photocatalytic destruction occurs only at the surface of the photocatalyst where the photocatalyst contacts the contaminants. If an insufficient level of mass transfer occurs, contaminants will pass directly through the treatment system without being subjected to the photocatalyst. Consequently, known photocatalytic air treatment systems are significantly oversized to overcome mass transfer limitations, which reduces the cost effectiveness of such systems.

Another known problem with known photocatalytic air treatment systems is fouling. Humid air streams may contain foulants that oxidize and/or collect on the surface of the photocatalyst. Coating or covering the photocatalyst with foulants therefore substantially lowers the efficiency of the photocatalyst due to a reduction in the effective surface area of the photocatalyst available for irradiation. To prevent the detrimental effects that may be brought about by fouling, the photocatalyst must be frequently cleaned or replaced. This is a time consuming and thus expensive procedure. In addition, bonding or affixing a photocatalyst to a substrate or bed reactor, and maintaining the photocatalyst immobilized, diminishes the efficiency and effectiveness of the photocatalyst. For example, the crystal structure of a photocatalyst is typically undesirably altered when a photocatalyst is heated in the course of bonding the photocatalyst to a substrate. It is also undesirable to replace an already bonded or affixed photocatalyst since such a replacement is a time consuming and expense procedure.

With known photocatalytic air treatment methods, safety issues arise when explosive ratios of contaminants exist in a given air stream. This follows since direct photocatalytic treatment can potentially ignite the explosive contaminants due to temperature elevation or the ignition source from an irradiation element.

SUMMARY OF THE INVENTION

Therefore, a need has arisen for a system and method for photocatalytic treatment of contaminated media that overcomes, among others, the aforementioned shortcomings of known photocatalytic treatment methods.

In accordance with the present invention, a system and method for photocatalytic treatment of contaminated media are provided that substantially eliminate or reduce the disadvantages and problems associated with known systems and methods for photocatalytic treatment of contaminated media.

According to the present invention, a photocatalytic process operating in an aqueous phase is employed to treat varying types of contaminated media, including air, soil or adsorbents (for example, activated carbon). For example, pursuant to the present invention, a liquid, such as water or another suitable substance, may be used to circulate and effect the decontamination of a contaminated media, in conjunction with a photocatalytic process. By transferring contaminated media to an aqueous phase, in which they are decontaminated by a photocatalytic process, significant advantages are derived.

One aspect of the present invention is a system for treating contaminated media. The system includes a converter such as a gas scrubber, which is used to transfer gaseous contaminants into a liquid media, such as a photocatalytic slurry. A photocatalytic system is connected to the converter and is used to oxidize and/or reduce the contaminants into non-harmful compounds using a photocatalytic reaction.

Another aspect of the present invention is a method for treating contaminated media. The method includes transferring contaminants to an aqueous phase. For example, airborne contaminants may be transferred to an aqueous phase by using a gas scrubber containing an aerosol, a liquid, activated carbon, or other suitable substances. The liquid media containing the contaminants is then treated by aqueous photocatalysis to reduce the contaminants.

Yet another aspect of the present invention is a method for treating contaminated media in a single vessel. The method includes injecting a contaminated gaseous media into the vessel. A photocatalytic slurry is then added to the vessel in a manner so as to adsorb the contaminants from the contaminated gaseous media, such as by spraying as an aerosol or by causing the catalytic slurry to flow counter current to the flow of the contaminated gas. The photocatalytic slurry with the adsorbed gaseous contaminants is then exposed to electromagnetic radiation, such as ultraviolet radiation, so that the contaminants may be reduced to non-harmful compounds.

The present invention provides many important technical advantages. One important technical advantage of the present invention is a system and method for photocatalytic treatment of contaminated media that provides for increased mass transfer of the air phase organic contaminant and the photocatalyst, which overcomes problems associated with poor adsorption of media phase organic compounds onto the photocatalyst.

Another important technical advantage of the present invention is a system and method for photocatalytic treatment of contaminated media in which the scaling of reactors for increased air flow rates can be easily accomplished by increasing the number and size of the nozzles and the size of the reaction chamber. In this manner, air treatment systems may be readily implemented that can treat volumes of air of up to hundreds of thousands of cubic feet per minute.

Another important technical advantage of the present invention is a system and method for photocatalytic treatment of contaminated media that allows irreversible electron acceptors, such as hydrogen peroxide, to be added to a photocatalytic slurry containing the contaminated media in order to increase reaction kinetics and thus reduce equipment size. This method allows organic pollutants to be treated in a nitrogen environment, such as under nitrogen blankets in process tanks, where oxidants can be added to the photocatalytic slurry without creating an explosion hazard.

Another important technical advantage of the present invention is a system and method for photocatalytic treatment of contaminated media in which the photocatalyst is mobilized and can be changed in-process, such as by draining the used photocatalytic slurry and adding unused photocatalytic slurry. In this manner, the treatment may be conducted continuously without requiring periodic shutdowns for replacement of photocatalyst elements.

Another important technical advantage of the present invention is a system and method for photocatalytic treatment of contaminated media in which the photocatalytic assemblies are not subject to inorganic fouling with substances, such as iron and calcium. The present invention utilizes a distributed photocatalytic element that is resistant to inorganic fouling.

Another important technical advantage of the present invention is a system and method for photocatalytic treatment of contaminated air that does not require control of the humidity level of the treated air. Yet another important technical advantage of the present invention is a system and method for photocatalytic treatment of contaminated media that utilizes a closed loop system that requires no continuous addition of liquid media or air.

Another important technical advantage of the present invention is a system and method for photocatalytic treatment of contaminated air that may be used to safely treat explosives (for example, nitroglycerine) or flammable contaminants in the aqueous phase rather than the air phase. In this manner, inadvertent explosion or ignition may be avoided.

BRIEF DESCRIPTION OF THE DRAWINGS

The accompanying drawings illustrate a preferred embodiment of the present invention wherein like reference numerals represent like parts, in which.

DETAILED DESCRIPTION OF THE DRAWINGS

The following description, with reference to the accompanying drawings, details a preferred embodiment of the present invention. It should, however, be appreciated that the present invention may be embodied in various other embodiments.

The present invention relates to the treatment of contaminated media by the use of a photocatalytic slurry-based photocatalytic treatment system. More specifically, the present invention provides for the transfer of organic contaminants from a liquid, solid, or gas phase into an aqueous phase, and the subsequent treatment of such contaminants by utilization of a photocatalytic slurry that preferably includes a photocatalyst, such as $TiO_2$, suspended freely in an aqueous phase. Placing the contaminants in an aqueous phase in which the photocatalyst is suspended in a photocatalytic slurry overcomes mass transfer problems by increasing the frequency of collisions between contaminants and photocatalyst particles. The present invention also provides for the pH of the aqueous stream of contaminants to be regulated so that foulants may, among other things, be substantially precluded from adhering to the surfaces of photocatalystic particles included in the photocatalytic slurry. Accordingly, the present invention provides for an improved technique by which contaminants are efficiently destroyed by utilizing a photocatalytic system operating in an aqueous mode.

Several procedures may be used to transfer contaminants into the aqueous phase for photocatalytic treatment. Contaminants that are already in the aqueous phase may be mixed directly with a photocatalyst. Contaminants in a solid media may be crushed and mixed with a liquid media or heated until the contaminants out-gas or are released, in which case the contaminants are then treated as contaminated gases. Contaminated gases, such as air, may be treated by scrubbing, by adsorption techniques, or by adsorption techniques such as by using activated carbon with subsequent steam stripping of the activated carbon after exposure to the contaminated gas. Atomized water may also be used to adsorb gaseous phase contaminants.

Airborne organic contaminants can be readily scrubbed into the aqueous phase, with sufficient water surface area to gas volume ratios. An air scrubber may comprise a packed bed column in which water or another suitable liquid is allowed to flow down the bed while contaminated air is introduced at the bottom such that phase transfer occurs. Also or alternatively, a nozzle may be used to spray water as fine particles into a chamber containing the contaminated gas, so as to increase the surface area to volume ratios. Using water that is free of organic contaminants will improve air scrubber efficiency, such that effluent water retrieved from the treatment system should be purified of organic contaminants before it can be reused for additional scrubbing.

Figure 1:
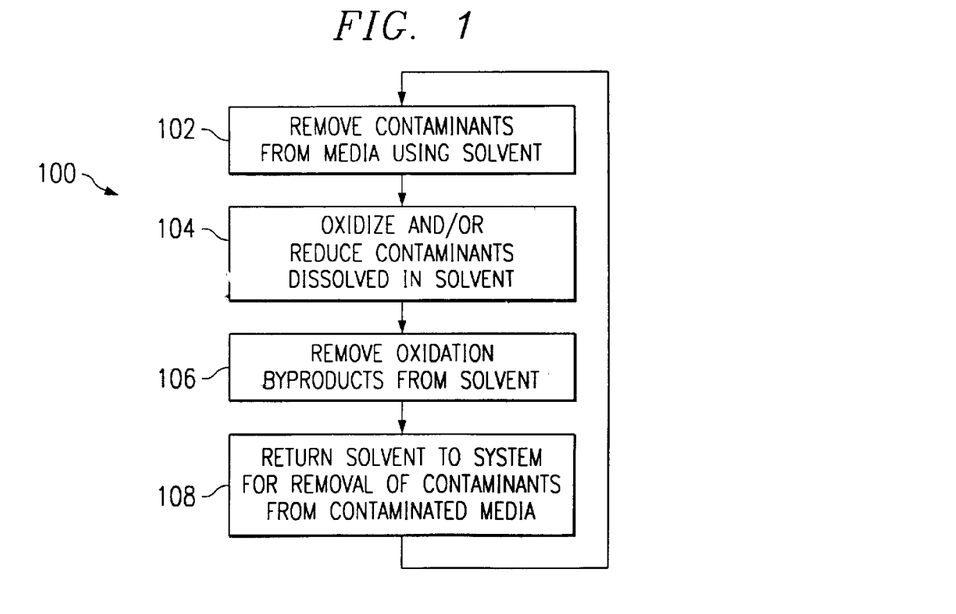
FIG. 1 is a flow chart of a method for treating contaminants in accordance with a preferred embodiment of the present invention.

FIG. 1 is a flow chart of a method 100 for treating contaminants in accordance with a preferred embodiment of the present invention. Method 100 may be used to treat contaminated gases, liquids, and solids, so as to oxidize or reduce the contaminants into harmless components.

Method 100 begins at step 102, where contaminants are removed from a contaminated media using water or another solvent. For example, water may be used to scrub contaminated air or soil, or an adsorbent such as activated charcoal may be used to adsorb the contaminants from the contaminated media prior to dissolving the contaminants with water in liquid or steam form. Other contaminated media, such as, for example, clothing, building materials, or soil, may be used where suitable. Other suitable solvents or mixtures, such as a surfactant, ethanol, or acetone, may be used.

At step 102, the contaminants are oxidized and/or reduced by a suitable process, such as by mixing a slurry of $TiO_2$ with the solvent and exposing the mixture to ultraviolet light. Other suitable compounds or processes may be used, such as photocatalytic oxidation processes, thermal catalytic processes, mechanical processes, or a suitable combination of such processes. For example, suitable chemicals such as oxidants or surfactants, may be added to the solvent prior to exposure of the photocatalytic slurry to radiation of a suitable wavelength. The method then proceeds to step 106.

At step 106, oxidation by-products are removed from the solvent by a suitable process. For example, the solvent may be distilled from the oxidation by-products, a reverse osmosis process may be used to collect the oxidation by-products (such as salts, metals, or other second phase constituents), an ion exchange process may be used to collect the oxidation by-products, or other suitable methods or processes may be used to remove the oxidation by-products from the solvent. The method then proceeds to step 108 where the cleaned solvent is returned to the system for removal of the contaminants from the contaminated media.

In operation, method 100 may be used to remove contaminants from a contaminated media and to reduce or oxidize the contaminants into harmless compounds. Method 100 preferably uses water as a solvent and a photocatalytic slurry, such as $TiO_2$, to reduce the contaminants. A contaminated media, such as air, soil, exhaust, manufacturing materials, building materials, industrial waste, or other suitable contaminated media are first cleaned with the solvent to remove contaminants. The solvent is then processed to oxidize and/or reduce the contaminants, such as by treating the solvent by a photocatalytic treatment process. After the contaminants have been oxidized, the oxidation by-products are removed from the solvent, such as by using ion-exchange resins or systems, reverse osmosis systems, or other suitable methods. The solvent may then be re-used.

Figure 2:
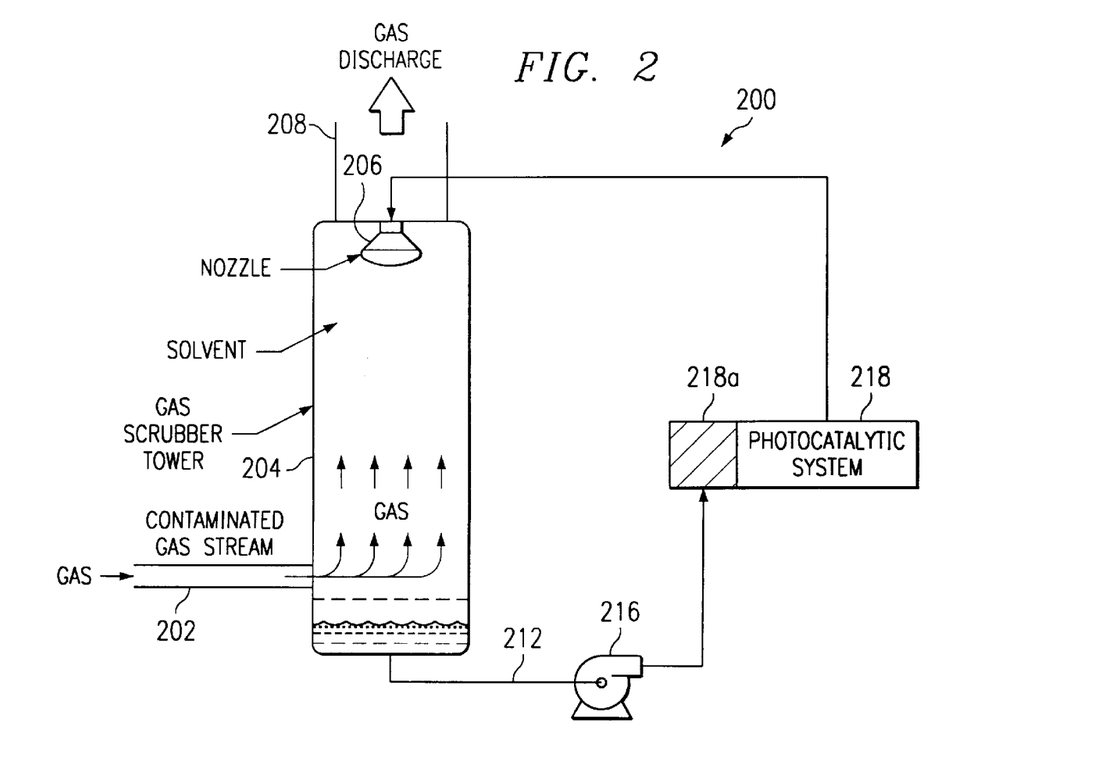
FIG. 2 is a block diagram of a system for treating airborne contaminants in accordance with a preferred embodiment of the present invention.

FIG. 2 is a block diagram of a system 200 for treating airborne contaminants in accordance with a preferred embodiment of the present invention. System 200 is used to transfer gaseous contaminants into the aqueous phase. Preferably, system 200 is used to treat airborne contaminants using water as a scrubbing solvent in a closed loop system, thus eliminating harmful emissions during treatment of the airborne contaminants. Other solvents and contaminated media may also or alternatively be decontaminated, as previously described.

A contaminated gas stream such as air having airborne contaminants is transferred by pipe 202 into a gas scrubber tower 204, which is a converter where the contaminants are converted or transferred from the gaseous phase into an aqueous phase. At the top of gas scrubber tower 204 is a nozzle 206 that downwardly disperses a solvent such as water, photocatalytic slurry, or another suitable liquid into gas scrubbing tower 204. The atomized molecules of the liquid may be passed to gas scrubber tower 204 through solvent supply lines 212 by, for example, a pump (not illustrated). The contaminated air stream, which is directed upwards through gas scrubber tower 204, therefore encounters the downward moving solvent within gas scrubber tower 204. The contaminants, such as volatile organic compounds or other contaminants, are then transferred from the gaseous phase to the aqueous phase such as by adsorption or absorption and travel downward to the bottom of gas scrubber tower 204. The contaminants, in aqueous phase with the water, photocatalytic slurry or other liquid, are then directed to a photocatalytic system 218 by pump 216. Photocatalytic system 218 is preferably configured to operate in an aqueous mode. Gas that is substantially free of contaminants is discharged through the top of gas scrubbing tower 204 through gas discharge 208. This gas may also be used in a closed loop system. Although one gas scrubber tower 204 is shown, two or more gas scrubber towers 204 may be used, with each being sized so as to obtain the level of contaminant removal treatment that is required to remove contaminants from the contaminated gas stream. The additional gas scrubber towers 204 may also be connected in series so as to decrease the level of contaminants to a predetermined acceptable level where the level of contaminants may vary over a wide range, thus allowing stages of the gas scrubber system to be shut off when not needed so as to conserve energy.

Aqueous phase contaminants are preferably passed to aqueous photocatalytic system 218 by pump 216. Such contaminants may, for example, be stored in a supply tank (not illustrated) before being passed to aqueous photocatalytic system 218. Aqueous photocatalytic system 218 is operable to treat such contaminants so as to oxidize or otherwise reduce the contaminants into non-harmful materials. By way of example but not limitation, a suitable aqueous photocatalytic system 218 that may be used to remove contaminants is the slurry-based photocatalytic system disclosed in U.S. Pat. No. 5,462,674, "Method and System for Photocatalytic Decontamination," Brian E. Butters and Anthony L. Powell inventors, issued Oct. 31, 1995, and U.S. Pat. No. 5,589,078, "Advanced Filtration Technique for Fluid Purification," Brian E. Butters and Anthony L. Powell, inventors, issued Dec. 31, 1996, each of which are hereby incorporated by reference for all purposes. However, other suitable photocatalytic systems, such as, for example, those disclosed in U.S. Pat. Nos. 5,118,422 and 5,174,877 issued to Cooper et al., may also be employed within the spirit and scope of the present invention. Aqueous photocatalytic system 218 may include a cleaning subsystem 218a that is operable to remove the oxidation and reduction by-products from the condensate and/or solvent, such as by ion exchange, reverse osmosis, distillation, or other suitable methods.

Aqueous photocatalytic system 218 is sized so as to oxidize or reduce contaminants, such as organic contaminants, at a rate that is faster than the rate at which they are introduced through gas scrubber tower 204.

The gas scrubber system and method shown and embodied in system 200 provides various advantages. First, the destruction of contaminants in the aqueous phase helps to minimize the level of contaminants in the solvent provided to gas scrubber tower 204 while maintaining system 200 as a closed loop system, such that no additional solvent is required to be added other than to compensate for evaporation, spills, leaks, and other inadvertent losses. Second, explosives such as nitroglycerine and flammable contaminants may be safely treated in the aqueous phase without incurring the hazards that would be posed by treatment of such contaminants in the air phase.

System 200 may be used to reduce or oxidize contaminants on-site where they are created, which eliminates the costs, liabilities, and potential for damages that may be associated with the handling and transport of airborne organic contaminants. If a slurry-based aqueous photocatalytic system is used to treat the contaminants, any salts that may be generated by the destruction of various contaminants will have little or no impact on the performance of the photocatalytic slurry-based treatment system.

Figure 3:
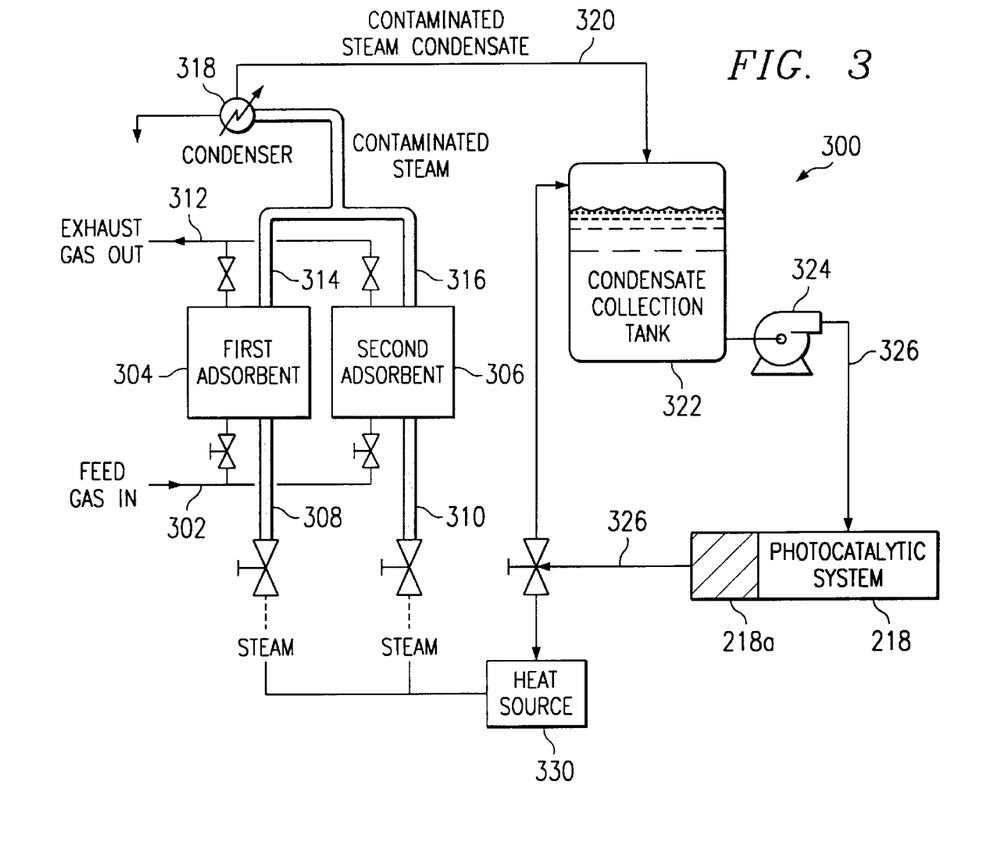
FIG. 3 is a schematic diagram of a treatment system in accordance with a preferred embodiment of the present invention.

FIG. 3 is a schematic diagram of treatment system 300 in accordance with a preferred embodiment of the present invention. Treatment system 300 uses an adsorbent such as activated carbon to transfer gaseous contaminants to the aqueous phase. Treatment system 300 is preferably used to treat contaminants such as volatile organic compounds in batches, and is a closed loop system that minimizes or eliminates harmful emissions during treatment of gaseous contaminants.

Activated carbon and steam stripping may be used to transfer gaseous contaminants to the aqueous phase for subsequent treatment by aqueous photocatalysis, particularly in the case of volatile organic compounds with boiling points ranging from 0° C. to over 200° C. Activated carbon is known to be effective at removing organic contaminants via surface adsorption. Nevertheless, the surface of the activated carbon will eventually adsorb a level of volatile organic compounds that will limit the effectiveness of further adsorption. The efficiency of the activated carbon for removal of volatile organic compounds may be improved by treatment of the activated carbon using low quality steam.

As the steam interacts with the activated carbon, contaminants adsorbed on the activated carbon boil off with the steam. The steam is subsequently condensed, with dissolved contaminants remaining in the condensate, and insoluble contaminants being removed by use of a decanter, coalescer, or other suitable process. The soluble organic compounds are treated by aqueous photocatalysis.

Treatment system 300 includes two or more activated carbon beds 304 and 306. An activated carbon bed is an assembly of activated carbon that may be used to remove contaminants from a liquid or gas, and is configured to optimize the removal of contaminants. A gas supply 302 provides a gas bearing contaminants, such as air containing volatile organic compounds, to each activated carbon bed 304 and 306. Likewise, steam from a suitable source, such as one or more boilers, is provided to each activated carbon bed 304 and 306 by steam supply lines 308 and 310, respectively. In this manner, contaminated gas may be provided to one activated carbon bed, such as activated carbon bed 304, while steam is being provided to the other activated carbon bed, such as activated carbon bed 306.

After the contaminants have been adsorbed by the activated carbon contained within activated carbon bed 304, contaminant-stripped gas is emitted from activated carbon bed 304 via gas exhaust outlet 312. As contaminated gas is stripped of contaminants by activated carbon bed 304, steam provided by steam supply line 310 is used to strip contaminants from activated carbon bed 306. After the effectiveness of the contaminant stripping provided by activated carbon bed 304 has decreased below a predetermined level, steam supply line 308 may be turned on so as to provide steam to activated carbon bed 304, and gas supply 302 to activated carbon bed 304 may be turned off. Likewise, the steam supply to activated carbon bed 306 may be turned off and the gas supply 302 may be turned on so as to allow activated carbon bed 306 to remove contaminants while activated carbon bed 304 is stripped.

One of the activated carbon beds, such as activated carbon bed 304 may thus be operated in a first mode to remove contaminants from the contaminated air stream while contaminants are stripped from another activated carbon bed that is operated in a second mode, such as activated carbon bed 306. The supply of steam and contaminated gas to each of the activated carbon beds 304 and 306 may thus be interchanged as different operating modes at predetermined intervals based on the time expired before carbon beds become spent, or in response to contaminant concentration data measured at gas exhaust outlet 312. The interchange may be accomplished by use of suitable valves associated with the carbon bed sets and air inputs and outputs, which may further be controlled by electronic circuitry and software. Additional activated carbon beds may also be provided to replace either of activated carbon beds 304 or 306 if the contaminants have not been removed by the time that the other of activated carbon beds 304 or 306 has become saturated with contaminants.

Contaminated steam from the activated carbon bed that is being stripped is transferred to condenser 318, such as by steam lines 314 and 316. Condenser 318 converts the contaminated stream to contaminated steam condensate which is provided to a condensate collection tank 322 via contaminated steam condensate line 320. In this manner, the carbon beds, condenser, and steam supply operate as a converter for converting gaseous phase contaminants to the liquid phase. Insoluble contaminants, such as organic compounds that are insoluble in water, are removed from the contaminated steam condensate by use of a decanter or other suitable method or apparatus. The steam condensate is then directed to aqueous photocatalytic system 218 through condensate lines 326 by pump 324. The steam condensate may also be transferred to a heat source 330, such as a boiler, to convert the condensate back into steam for use in cleaning activated carbon beds 304 and 306. The aqueous photocatalytic system 218 is operable to oxidize, reduce, or otherwise render harmless contaminants contained in the condensate, and includes a cleaning subsystem 218a (if required) that is operable to remove the oxidation and reduction by-products from the condensate, such as by ion exchange, reverse osmosis, distillation, or other suitable methods.

The activated carbon bed shown and described by treatment system 300 provides various advantages. First, the process can be operated as a closed loop, as the contaminated steam condensate can be used to produce steam after aqueous photocatalysis. Second, a photocatalytic slurry treatment system can be used with treatment system 300 to handle high concentrations of organic contaminants, such as may be produced from condenser 318. Alternatively, system 300 may be operated with a single carbon bed, but the process would then need to be discontinuous, such that a continuous stream of contaminated gas could not be treated without interruption. This configuration may be used where the gaseous contaminants are generated for brief periods of time.

Figure 4:
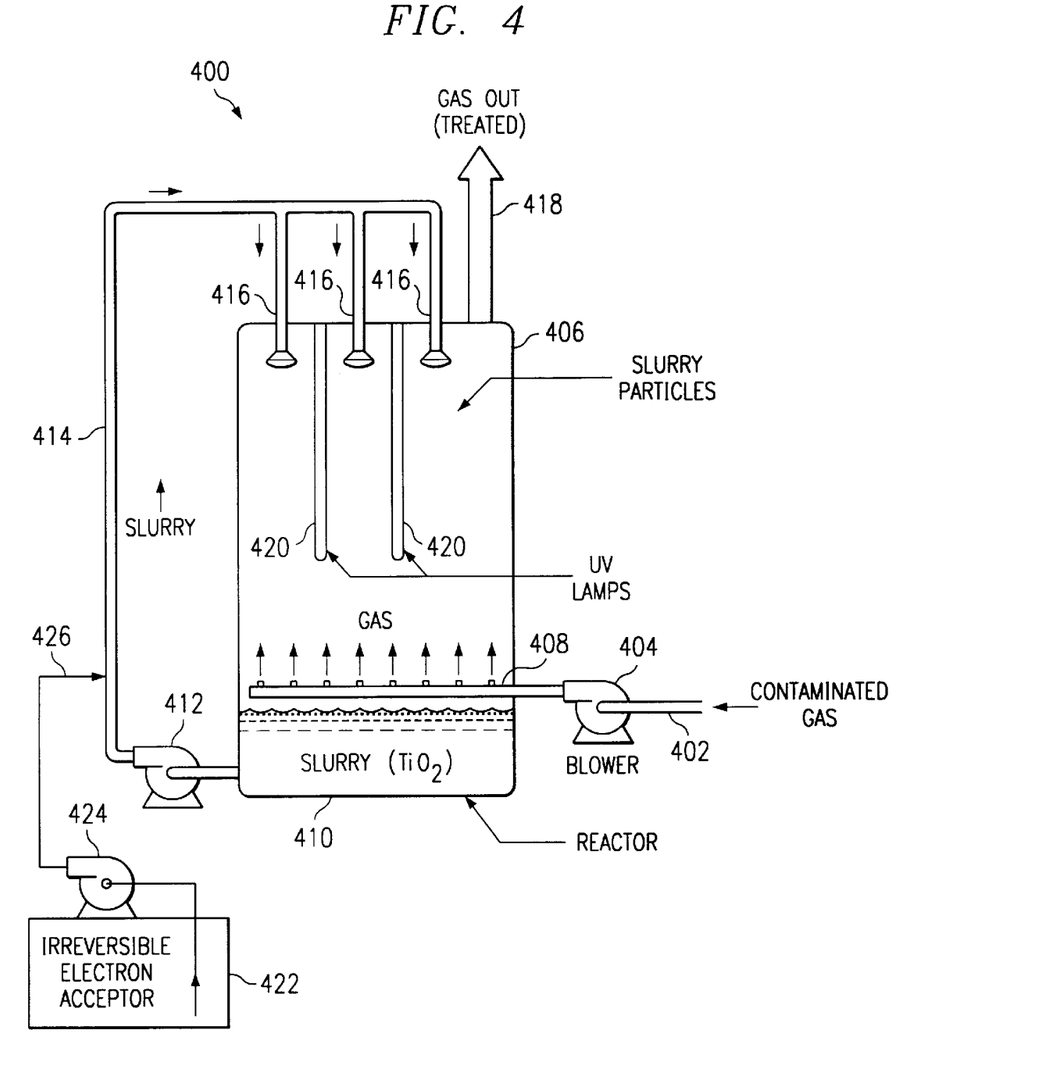
FIG. 4 is a schematic diagram of a treatment system in accordance with a preferred embodiment of the present invention.

FIG. 4 is a schematic diagram of treatment system 400 in accordance with a preferred embodiment of the present invention. Treatment system 400 includes reactor 406 which has a header 416 that is configured to inject photocatalytic slurry into reactor 406. For example, header 416 may have multiple nozzles or other injection devices at the top of the reactor to disperse low micron and/or sub-micron solvent particles containing a photocatalytic compound or compounds downward into reactor 406, or may inject photocatalytic slurry in liquid phase into reactor 406. Reactor 406 further includes one or more radiation-emitting devices 420 such as ultraviolet lamps, which may be disposed near the top of the reactor. Air intake header 408 is provided at the bottom of reactor 406, and is used to direct a contaminated gas stream from gas intake 402 and blower 404 in an upward direction within reactor 406.

Treatment system 400 preferably utilizes atomization of a solvent-based photocatalytic slurry, such as $TiO_2$ dissolved in water. Atomization may be accomplished by several methods, such as by the use of a header 416 having nozzle configured for atomization, or by the use of acoustic energy or other suitable systems or methods. According to one aspect of the present invention, one or more photocatalyst compounds are added to a closed loop water supply to form a photocatalytic slurry 410. Pump 412 is used to move photocatalytic slurry 410 though photocatalytic slurry feed line 414 to header 416, such as those used in an air scrubber. Inside reactor 406, an arrangement of radiation-emitting devices 420 such as ultraviolet lamps are provided in order to supply the required energy to promote photocatalysis. The radiation-emitting devices are arranged so as to maximize the irradiation of the photocatalytic slurry flow field within reactor 406. Treatment system 400 thus combines the process of transferring contaminants into an aqueous phase, such as by adsorption, and the process of photocatalysis, such as with a photocatalytic slurry, within a single reactor such that they are undertaken virtually contemporaneously.

The contaminated gas, such as air, is preferably transferred through reactor 406 in a direction counter-current to the photocatalytic slurry, in order to increase the Reynolds Number of the photocatalytic slurry and thus the mixing or mass transfer. The contaminated gas will contact the photocatalytic slurry as a function of the Reynolds Number. The rate at which the contaminants, such as volatile organic compounds, are reduced or oxidized is likewise a function of the Reynolds Number. After treatment, the air that has been treated for removal of contaminants is discharged through vent 418, and the photocatalytic slurry 410 is re-circulated by pump 412 and photocatalytic slurry feed line 414 for continuing use. The discharged air may be treated with additional reactor stages in order to reduce the level of contaminants to a predetermined acceptable level, if necessary, but a single reactor stage is preferably used. Reactor 406 thus operates to transfer gaseous contaminants to the liquid phase, and to convert contaminants into harmless compounds by aqueous photocatalysis.

Treatment system 400 provides many important technical advantages. One important technical advantage is that mass transfer between the gaseous phase contaminants and the photocatalytic slurry is greatly increased. Scaling of reactor 406 for increased air flow rates can also be easily accomplished by increasing the size of the air intake header 408, the number of nozzles 409, and the size of reactor 406. This advantage allows for treatment of air flow rates in excess of one hundred thousand cubic feet per minute.

The present invention also provides effective aeration for the photocatalytic oxidation. A conditioner such as an irreversible electron acceptors, for example, hydrogen peroxide, may likewise be added to the photocatalytic slurry from an electron acceptor tank 422 into photocatalytic slurry feed line 414, using a pump 424 and supply line 426. The conditioners may include compounds that are used to improve the interaction between the contaminants and the photocatalytic slurry, such as an oxidant, nutrients, surfactants, or other suitable compounds. Organic pollutants may thus be treated in pure nitrogen, such as by treating the contaminated gas with photocatalytic slurry while using a nitrogen blanket in the process tanks, as an oxidant or oxidants in the form of irreversible electron acceptors can be added directly to the photocatalytic slurry.

Treatment system 400 includes a mobilized photocatalytic slurry that can be changed out in-process or during a brief outage, as suitable. The photocatalytic slurry used in treatment system 400 is not subject to inorganic fouling with substances such as iron and calcium. The irradiation devices 420, such as ultraviolet lamps, may be replaced in-service thus allowing the system to remain in operation while the irradiation devices 420 are being serviced. Furthermore, treatment system 400 has no humidity factor requirements that must be controlled, as the photocatalytic reaction occurs in an aqueous solution. This feature eliminates the need for controlling the temperature of the air stream to obtain a desired humidity level. These advantages result in less equipment, hardware, control systems, power systems, instrumentation systems, and other systems and components than in known contaminant reduction systems.

Figure 5:
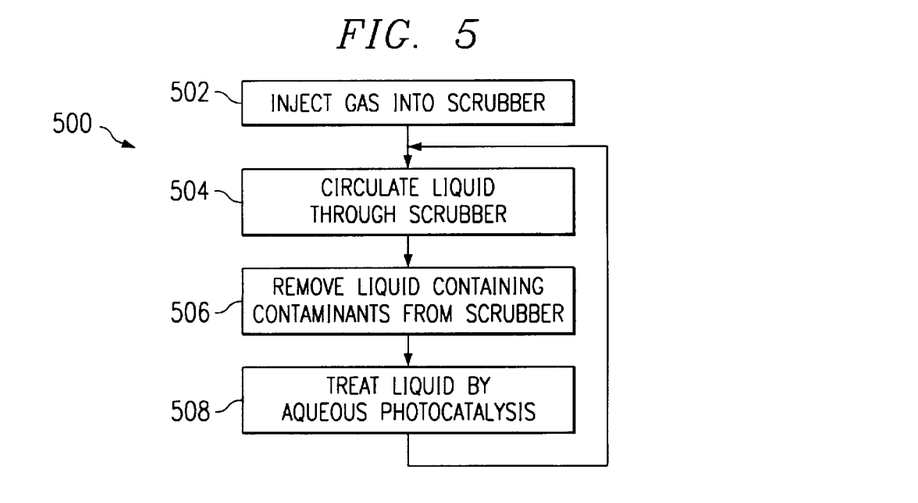
FIG. 5 is a flow chart of a method for treating contaminated media in accordance with a preferred embodiment of the present invention.

FIG. 5 is a flow chart of a method 500 for treating contaminated media in accordance with a preferred embodiment of the present invention. Method 500 begins at step 502, in which a gas that carries or includes contaminants, such as volatile organic compounds, is injected into a gas scrubber. The gas may be air that has been collected from an area in which volatile organic compounds are being used, air that includes combustion gases from a waste burning process, or other suitable gases that include contaminants. The gas may be injected by a suitable method, such as by injecting through a header of nozzles into a liquid, gas, aerosol, permeable solid material, or other suitable materials.

After the gas injection into the scrubber is initiated, the method proceeds to step 504, where a liquid is circulated through the scrubber. The liquid may be water or other suitable solvents that are used to adsorb or dissolve gaseous contaminants. The liquid may be circulated through the scrubber by injecting the liquid through a header of jet nozzles so as to form an aerosol with subsequent collection at a gravity collection point, by circulating the liquid in liquid phase, or by other suitable methods. The method then proceeds to step 506.

At step 506, the liquid containing adsorbed contaminants is removed from the scrubber, and the gas that has been cleaned of contaminants is discharged from the scrubber. Preferably, if the gas used is air, then the level of contaminants remaining in the discharged gas is low enough that the air may be discharged directly to the environment or re-used. If the predetermined level of contaminant concentration has not been reached, then the discharged gas may be fed back into another gas scrubber unit for subsequent contaminant removal. The liquid containing contaminants may be removed by collection at a gravity collection point, such as where aerosol particles of liquid may accumulate, and may then be transferred to a holding tank for subsequent treatment. Likewise, if the liquid is circulated in liquid phase through the scrubber, it may be collected and pumped out of the scrubber. The liquid is then treated by with aqueous photocatalysis at step 508, such as by transferring the liquid from the holding tank to a slurry-based aqueous photocatalytic system.

Method 500 is a continuous treatment process, such that steps 502 through 508 continue after being initiated. Furthermore, the order of steps shown is exemplary, and the steps may be initiated in a suitable manner. For example, circulation of liquid through the scrubber may be initiated prior to injection of gas, or other method steps may be interchanged as suitable.

Method 500 may thus be used to treat contaminants by removing them from a gaseous phase using a gas scrubber and a liquid or aerosol solvent, and by then reducing them using a photocatalytic treatment system. The contaminants may be gaseous or may be converted to a gaseous phase from a liquid or solid phase, such as by burning or heating. Multiple gas scrubber stages may be used to reduce the level of contaminants to a predetermined level. In this manner, the present invention provides a modular and expandable method for treating contaminants that may be used where the contaminants are created, in order to reduce the cost and complexity of the contaminant treatment process.

Figure 6:
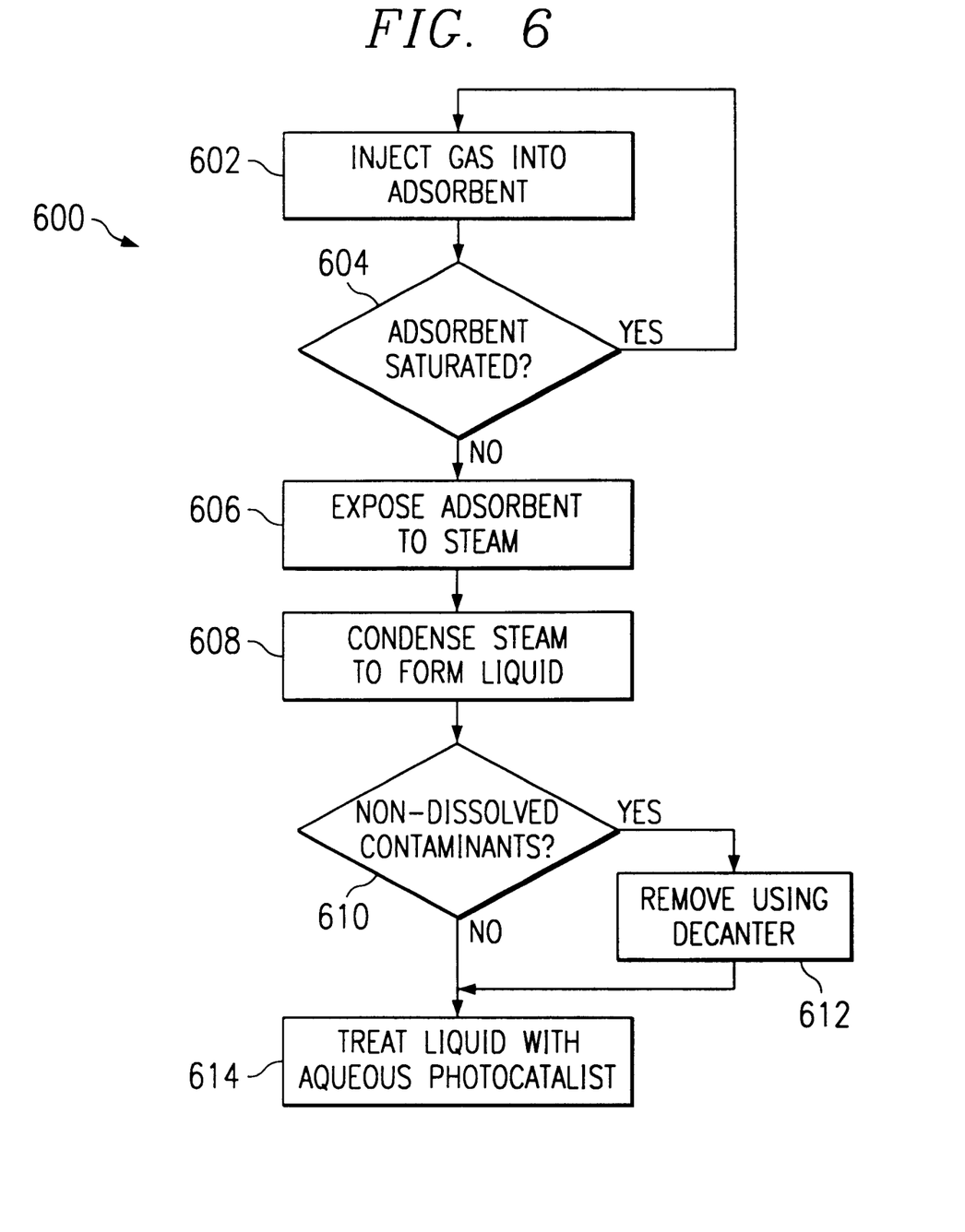
FIG. 6 is a flow chart of a method for scrubbing contaminants from a gas in accordance with a preferred embodiment of the present invention.

FIG. 6 is a flow chart of a method 600 for scrubbing contaminants from a gas in accordance with a preferred embodiment of the present invention. Method 600 begins at step 602, where gas that includes contaminants is injected into an adsorbent, such as activated carbon. For example, the gas may be injected with gas nozzles into an activated carbon bed that is contained in a vessel, such that the gas must flow through the activated carbon before it can exit the vessel so that the contaminants may be adsorbed onto the surface of the activated carbon. The method then proceeds to step 604, where it is determined whether the activated carbon has become saturated with contaminants to the point that it is no longer effectively removing contaminants. For example, the length of time that the activated carbon may be used to determine whether the activated carbon has become saturated if the contaminant concentration levels are known, the level of contaminants remaining in the gas after treatment with the activated carbon may be determined such as by using a sensor, or other suitable methods may be used to determine whether the activated carbon has become saturated. If the activated carbon is saturated, The method then proceeds to step 606, otherwise the method returns to step 602.

At step 606, the activated carbon is exposed to steam, such as by injecting steam through steam nozzles into the activated charcoal. In this manner, the contaminants that have been adsorbed onto the activated carbon are dissolved into the steam. This method for removal of contaminants from activated carbon is most effective at removing volatile organic contaminants, but may also be used to remove other contaminants.

At step 608, the steam carrying contaminants is condensed to form a liquid, such as by causing the steam to flow through a condenser. The condensate is then collected, and it is determined at step 610 whether there are any non-dissolved contaminants, such as contaminants that are insoluble in water or solid contaminants. If such contaminants are present, the method proceeds to step 612 where the non-dissolved contaminants are removed using a decanter or by another suitable apparatus or method. Otherwise, or after the non-dissolved contaminants are removed at step 612, the method proceeds to step 614 where the dissolved contaminants are treated using aqueous photocatalysis so as to reduce the contaminants to harmless components.

Figure 7:
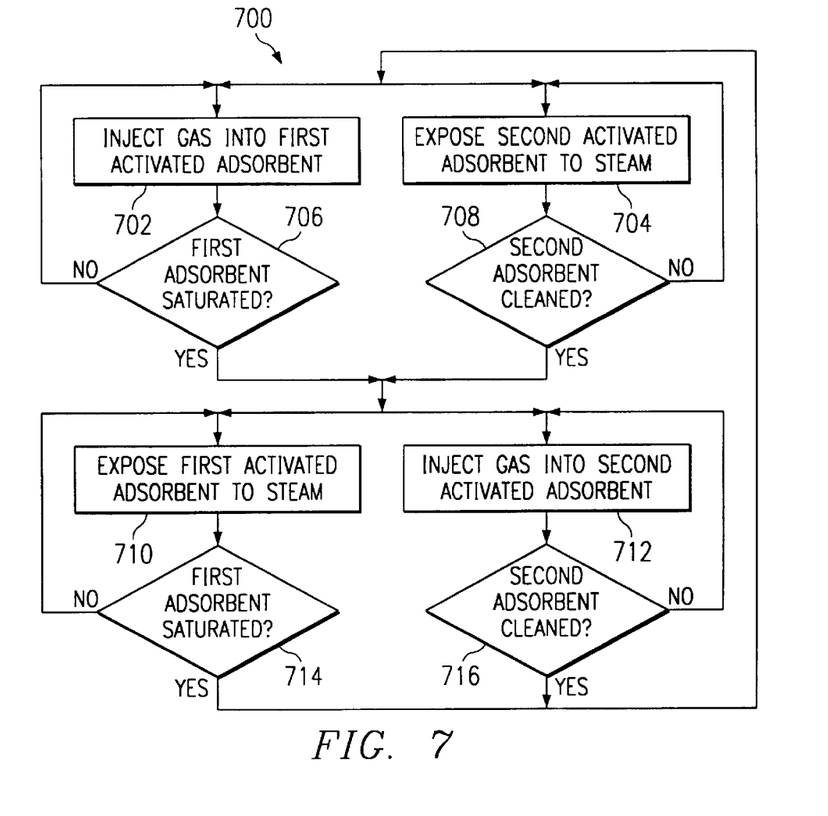
FIG. 7 is a flow chart of a method for scrubbing contaminants from a gas in accordance with a preferred embodiment of the present invention.

FIG. 7 is a flow chart of a method 700 for scrubbing contaminants from a gas in accordance with a preferred embodiment of the present invention. Method 700 begins at steps 702 and 704, which are performed in parallel. At step 702, gas containing contaminants is injected into a first activated carbon bed, such that the activated carbon removes the contaminants from the gas. At step 704, a second activated carbon bed is exposed to steam, such as a carbon bed that has previously been exposed to contaminants and which has become saturated with contaminants to a level that the contaminants are not being removed from the carrier gas to a predetermined level. In this manner, a first activated carbon bed is used in a first mode to remove contaminants from a carrier gas while the contaminants are removed from a second activated carbon bed that is operating in a second mode.

After the gas is injected into the first carbon bed at step 702 the method proceeds to step 706, where it is determined whether the first bed is saturated. If the first bed is not saturated, the method returns to step 702. Otherwise, the method proceeds to steps 710 and 712. Likewise, at step 708 it is determined whether the second activated carbon bed is clean. If the bed is clean, the method proceeds to steps 710 and 712, otherwise the method returns to step 704. Preferably, the length of time required to clean either of the activated carbon beds is less than the length of time required for the activated carbon beds to become saturated with contaminants if only two activated carbon beds are utilized, such that step 708 proceeds to steps 710 and 712 before step 706. Alternatively, an additional activated carbon bed may be used, such that the additional activated carbon bed is used in place of the first or second activated carbon bed at steps 710 and 712.

Steps 710 and 712 are also performed in parallel. At step 710, the first activated carbon bed is operated in the second mode and is exposed to steam in order to remove the contaminants that were adsorbed to the activated carbon at step 702. The method then proceeds to step 714, where it is determined whether the steam has removed an acceptable amount of the contaminants from the first activated bed. If the activated carbon bed has been cleaned, the method returns to steps 702 and 704. Otherwise, the method returns to step 710. At step 712, a gas bearing contaminants is injected into the second activated carbon bed, which is operated in the first mode to remove the contaminants from the gas. The method then proceeds to step 716 where it is determined whether the second activated carbon bed has become saturated with contaminants. If the activated carbon has become saturated, the method proceeds to steps 702 and 704, otherwise the method returns to step 712.

In this manner, gas bearing contaminants may be continuously cleaned with activated carbon, and the activated carbon may be cleaned of the adsorbed contaminants without interrupting the gas cleaning operations. The steam that is used to clean the activated carbon may subsequently be condensed, and the dissolved contaminants in the condensate may be reduced to harmless compounds by aqueous photocatalysis.

Figure 8:
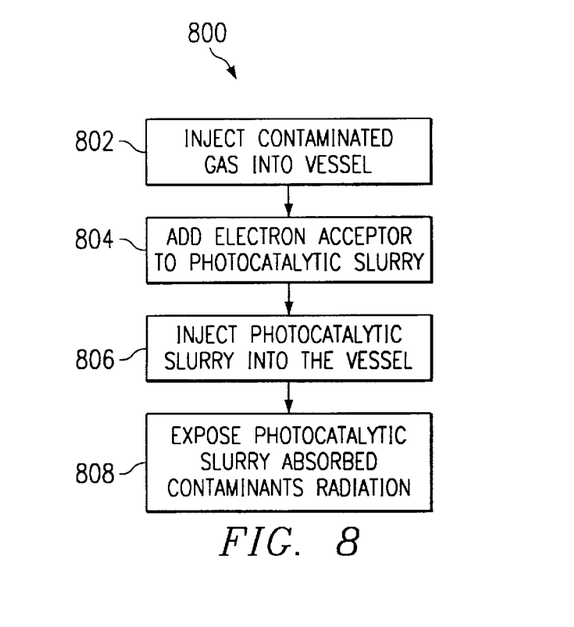
FIG. 8 is a flow chart of a method for treating contaminated media in accordance with a preferred embodiment of the present invention.

FIG. 8 is a flow chart of a method 800 for treating contaminated media in accordance with a preferred embodiment of the present invention. Method 800 may be used to treat contaminated media with a photocatalytic slurry in a single vessel. Method 800 begins at step 802, where gas bearing contaminants is injected into the vessel. For example, the gas may be injected using a header with gas nozzles, the vessel may be flooded with photocatalytic slurry and the gas may be injected through a screen to create micro-bubbles, or other suitable methods may be used. Any water to air ratio may be used. The method then proceeds to step 804, where an electron acceptor such as hydrogen peroxide is added to a photocatalytic slurry. Step 804 may be omitted, but typically improves the effectiveness of the photocatalytic process. The method then proceeds to step 806.

At step 806, the photocatalytic slurry is injected into the vessel. For example, the photocatalytic slurry may be injected by spraying the photocatalytic slurry through a header of nozzles to create a micron or sub-micron aerosol mist, the photocatalytic slurry may be pumped into the vessel in liquid phase, or other suitable methods may be used to inject the photocatalytic slurry into the vessel. The injected photocatalytic slurry and the injected gas bearing contaminants then interact and the contaminants are transferred from the gas to the photocatalytic slurry, such as by adsorption. The method then proceeds to step 808, where the photocatalytic slurry bearing contaminants is exposed to radiation, such as ultra-violet radiation or other suitable radiation that will cause a photocatalytic oxidation and/or reduction of the contaminants to occur. The photocatalytic slurry may then be removed for subsequent treatment of contaminants (if required), and the cleaned gas is vented from the vessel. If the level of contaminants in the gas has not dropped to a predetermined acceptable level, then the gas may be fed into one or more additional stages for additional decontamination.

Figure 9:
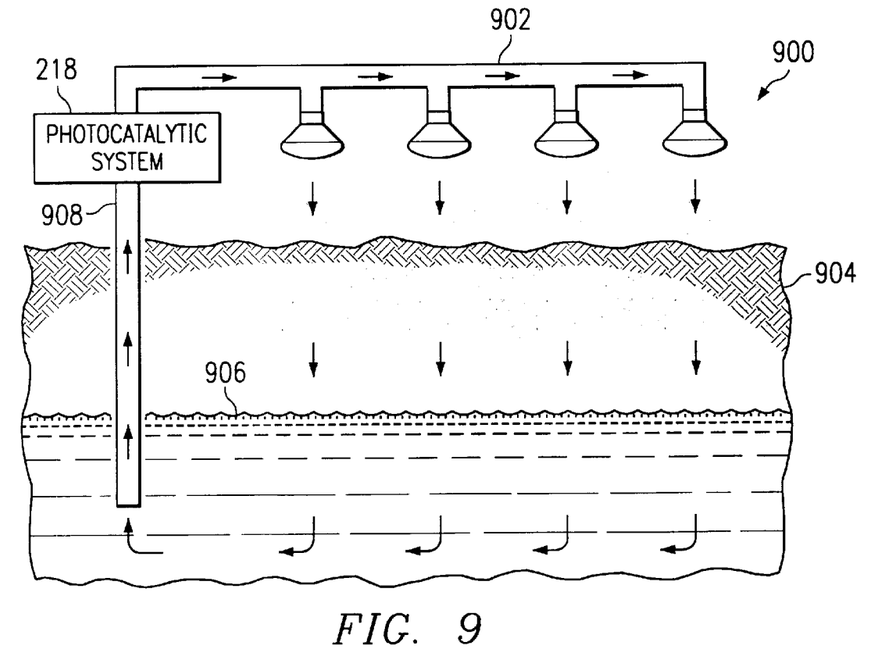
FIG. 9 is a diagram of a system for treating contaminated soil in accordance with a preferred embodiment of the present invention.

FIG. 9 is a diagram of a system 900 for treating contaminated soil in accordance with a preferred embodiment of the present invention. System 900 includes aqueous photocatalytic system 118, which is coupled to spray header 902. A solvent such as water is sprayed onto or into contaminated soil 904 by spray header 902. The earth's gravity causes the water to soak through the soil, and the water adsorbs contaminants from the soil as it passes through the soil. The water, with contaminants, then collects in the water table 906.

Water intake apparatus 908 is used to collect the contaminated water from the water table 906, and to carry the contaminated water to aqueous photocatalytic system 118. Aqueous photocatalytic system 118 is then used to oxidize or reduce the contaminants and to remove the oxidation by-products from the water. The cleaned water is then returned to header 902.

Figure 10:
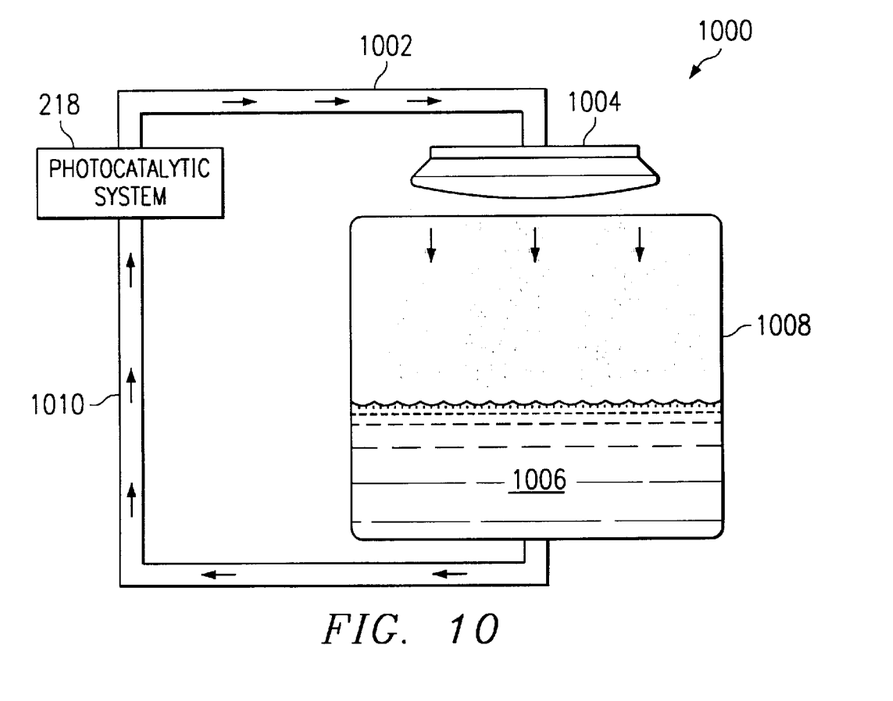
FIG. 10 is a diagram of a system for treating contaminated media in accordance with a preferred embodiment of the present invention.

FIG. 10 is a diagram of a system 1000 for treating contaminated media in accordance with a preferred embodiment of the present invention. System 1000 includes aqueous photocatalytic system 118, which is coupled to pipe 1002 and header 1004. Header 1004 is used to spray a solvent, such as water, onto a contaminated media 1006, such as soil. The contaminated media 1006 is contained within a holding tank 1008, and the solvent washes through the contaminated media and removes the contaminants. The solvent with dissolved contaminants collects at the bottom of the holding tank 1008. Drain pipe 1010 is used to transfer the solvent to aqueous photocatalytic system 118, which is used to oxidize or reduce the contaminants and to remove the oxidation by-products from the water. The cleaned solvent is then returned to header 1004.

While an embodiment of the present invention has been described in detail, the present invention includes embodiments different from those described, yet within the scope of the claims. For example, the "scrubber," "reactor," "activated carbon bed, "photocatalytic system," "solvent," "solvent supply tank," and "condensate collection tank" may be implemented in a manner that is functionally identical but structurally different from that shown herein. Such changes are contemplated as being within the scope of the present invention. Likewise, the present invention may be implemented using air or other suitable gases, water or other suitable solvents, activated carbon or other adsorbents, and $TiO_2$ or other suitable photocatalytic compounds. Likewise, the connections and flow paths of contaminant streams, solvents, steam, condensate, photocatalytic slurry, or other substances may be modified where suitable without departing from the scope of the present invention as set out in the appended claims.

While the present invention has been described with reference to a preferred embodiment, this description is not intended to be construed in a limiting sense. Various modifications and combinations of the preferred embodiment, as well as other embodiments of the invention, will be apparent to persons skilled in the art upon reference to the description. It is therefore intended that the appended claims not be limited to the described preferred embodiment and instead encompass any such modifications or embodiments.

What is claimed is:

1. A system for treating contaminated media comprising:
    a converter configured to transfer contaminants from contaminated media into a solvent, the converter comprising:
        a first adsorbent system configured to operate in a first mode in which contaminants are removed from a gas and a second mode in which steam is the solvent that is used to remove contaminants from the first adsorbent system;
        a second adsorbent system configured to operate in a first mode in which contaminants are removed from the gas and a second mode in which steam is the solvent that is used to remove contaminants from the second adsorbent system; and
        wherein the first adsorbent system operates in the first mode when the second adsorbent system operates in the second mode, and the first adsorbent system operates in the second mode when the second adsorbent system operates in the first mode;
    a photocatalytic system coupled to the converter, the photocatalytic system operable to cause the contaminants in the solvent to undergo a photocatalytic reaction; and
    a condenser coupled to the first adsorbent system and the second adsorbent system, the condenser operable to condense the steam and any contaminants that are carried by the steam.

2. The system of claim 1 wherein the pH of the solvent may be regulated so that foulants may be substantially precluded from adhering to the surfaces of photocatalyst particles included in the photocatalytic system.

3. The system of claim 1 wherein the solvent is liquid water.

4. The system of claim 1 wherein the solvent is steam.

5. The system of claim 1 wherein the contaminated media is air.

6. The system of claim 1 wherein the contaminated media is a liquid.

7. The system of claim 1 wherein the contaminated media is a solid.

8. The system of claim 7 wherein the solid is soil.

9. The system of claim 1 wherein the converter and the photocatalytic system are contained within a single vessel.

10. The system of claim 1 wherein the converter is a gas scrubber system.

11. The system of claim 1 wherein the converter is an adsorbent system.

12. The system of claim 11 wherein the adsorbent system is an activated carbon bed system.

13. The system of claim 1 further comprising a third adsorbent system that is used to remove contaminants from a gas if all contaminants from the gas have not been removed by either the first adsorbent system or the second adsorbent system.

14. The system of claim 1 further comprising:
   a condenser coupled to the first adsorbent system and the second adsorbent system, the condenser operable to condense the steam and any contaminants that are carried by the steam into a condensate; and
   a contaminant removal system coupled to the condenser, the contaminant removal system operable to draw off contaminants that are not dissolved in the condensate.

15. The system of claim 14 wherein the contaminant removal system is a decanter.

16. The system of claim 1 wherein the converter further comprises:
   a tank for holding the liquid media;
   a gas injection system coupled to the tank, the gas injection system operable to inject gas into the tank;
   a gas discharge coupled to the tank; and
   a liquid circulation system coupled to the tank, the liquid circulation system operable to remove liquid bearing contaminants from the tank and transfer the liquid to the photocatalytic system, and to transfer processed liquid from the photocatalytic system to the tank.

17. The system of claim 16 wherein the liquid circulation system is further operable to inject the processed liquid into the tank through one or more nozzles so as to create an aerosol, and to remove liquid from a gravity collection point where the aerosol accumulates to form the liquid bearing contaminants.

18. The system of claim 1 wherein the photocatalytic system further comprises a photocatalytic slurry.

19. The system of claim 1 further comprising one or more additional converters coupled in series to the converter such that the contaminated gas flows in series through each converter in order to reduce the level of contaminants in the gas with each converter stage.

20. The system of claim 1 wherein the first adsorbent system and the second adsorbent system further comprise activated carbon.

* * * * *